US010098336B2

(12) United States Patent
Darnell et al.

(10) Patent No.: US 10,098,336 B2
(45) Date of Patent: Oct. 16, 2018

(54) INSECT TRAP FOR A GARBAGE RECEPTACLE (71) Applicants: Dennis Darnell, San Diego, CA (US); Joylyn Darnell, San Diego, CA (US)

(72) Inventors: Dennis Darnell, San Diego, CA (US); Joylyn Darnell, San Diego, CA (US)

(*) Notice: Subject to any disclaimer, the term of this patent is extended or adjusted under 35 U.S.C. 154(b) by 355 days.

(21) Appl. No.: 14/840,300

(22) Filed: Aug. 31, 2015

(65) Prior Publication Data
US 2017/0055513 A1  Mar. 2, 2017

(51) Int. Cl.
A01M 1/10 (2006.01)
A01M 1/12 (2006.01)
B65F 1/16 (2006.01)

(52) U.S. Cl.
CPC ............ A01M 1/12 (2013.01); A01M 1/10 (2013.01); A01M 1/103 (2013.01); A01M 1/106 (2013.01); B65F 2001/1653 (2013.01)

(58) Field of Classification Search
CPC .......... A01M 1/10; A01M 1/106; A01M 1/12; A01M 1/14
USPC .................... 43/120, 107, 122, 114
See application file for complete search history.

(56) References Cited

U.S. PATENT DOCUMENTS

| 1,114,191 | A | * | 10/1914 | Shapiro | 43/120 |
| 1,212,660 | A | * | 1/1917 | Meade | 43/120 |
| 1,223,873 | A | * | 4/1917 | Hartt | B65F 1/08 43/120 |
| 1,244,859 | A | * | 10/1917 | Johnson | 43/120 |
| 1,276,770 | A | * | 8/1918 | Jones | A01M 23/08 43/120 |
| 1,290,760 | A | * | 1/1919 | Langbein | 43/120 |
| 1,321,286 | A | * | 11/1919 | Connolly | 43/120 |
| 1,324,727 | A | * | 12/1919 | Carlson | 43/115 |
| 1,360,127 | A | * | 11/1920 | McKay | A01M 1/2005 43/122 |
| 1,463,659 | A | * | 7/1923 | Paul | A01M 1/02 43/120 |
| 1,467,895 | A | * | 9/1923 | Dunseth | A01M 1/02 43/120 |
| 1,597,236 | A | * | 8/1926 | Lee | A01M 1/02 43/120 |

(Continued)

FOREIGN PATENT DOCUMENTS

EP       1155614 A2 * 11/2001 ............ A01M 1/10
JP    2005087199 A  *  4/2005
(Continued)

Primary Examiner — Darren W Ark
(74) Attorney, Agent, or Firm — Greenspoon Marder LLP; Todd J. Langford (57) ABSTRACT An insect trap that is attached or molded onto a garbage receptacle and that relies on the garbage inside the garbage receptacle to attract or lure insects into a trap compartment designed to effectively entrap said insects permanently. Once the trap compartment is ready to be discarded, a release mechanism driven by an actuator is used to press the trap compartment against a release plate until the trap compartment is released or dislodged into the garbage receptacle. Thus, the user of the insect trap does not have to physically touch the trap compartment that is full of trapped insects. Instead, through the use of the actuator, the trap compartment is released directly into the garbage compartment.

18 Claims, 14 Drawing Sheets

(56) References Cited

U.S. PATENT DOCUMENTS

| | | | | |
|---|---|---|---|---|
| 1,607,249 | A * | 11/1926 | Dyer | A01M 1/10 43/120 |
| 1,815,122 | A * | 7/1931 | Smith | A01M 1/02 43/120 |
| 2,113,908 | A * | 4/1938 | Thompson | A01M 23/00 43/120 |
| 3,098,703 | A * | 7/1963 | Snyder | A01M 1/2055 220/87.1 |
| 3,661,326 | A * | 5/1972 | Wilson | A01M 1/2055 220/87.1 |
| 4,218,842 | A * | 8/1980 | Anderson | A01M 1/02 215/321 |
| 4,501,088 | A * | 2/1985 | Boisvert | A01M 1/02 43/118 |
| 5,280,684 | A * | 1/1994 | Filonczuk | A01M 1/02 43/112 |
| 5,392,558 | A * | 2/1995 | Blomquist | A01M 1/02 43/107 |
| 5,682,706 | A * | 11/1997 | Altenburg | A01M 1/02 43/107 |
| 5,749,168 | A * | 5/1998 | Chrysanthis | A01M 1/02 43/114 |
| 5,884,801 | A * | 3/1999 | Simpson | B65F 1/0006 220/495.08 |
| 6,016,625 | A * | 1/2000 | Bishoff | A01M 1/026 43/107 |
| 6,532,695 | B1 * | 3/2003 | Alvarado | A01M 1/106 43/107 |
| 7,310,907 | B2 * | 12/2007 | Suteerawanit | A01M 1/106 43/107 |
| 8,677,678 | B2 * | 3/2014 | Schneidmiller | A01M 1/106 43/122 |
| 9,402,383 | B2 * | 8/2016 | Bonacic Kresic | A01M 1/103 |
| 9,504,244 | B2 * | 11/2016 | Highet | A01M 25/004 |
| 2004/0237379 | A1 * | 12/2004 | Long | A01M 1/02 43/107 |
| 2006/0242891 | A1 * | 11/2006 | Marshall | A01K 5/0142 43/131 |
| 2008/0163541 | A1 * | 7/2008 | Harris | A01M 1/10 43/120 |
| 2008/1063541 | | 7/2008 | Harris | |
| 2009/0071060 | A1 * | 3/2009 | McKay | A01M 1/106 43/122 |
| 2013/0152452 | A1 * | 6/2013 | Lazzarini | A01M 1/02 43/114 |
| 2013/0255134 | A1 * | 10/2013 | Robinson | A01M 1/02 43/114 |
| 2014/0259877 | A1 * | 9/2014 | Singleton | A01M 23/02 43/107 |
| 2014/0290122 | A1 * | 10/2014 | Vasudeva | A01M 1/023 43/58 |
| 2014/0311015 | A1 * | 10/2014 | Oehlschlager | A01M 1/023 43/114 |
| 2015/0216158 | A1 * | 8/2015 | Mizrach | A01M 1/2016 43/107 |
| 2016/0128313 | A1 * | 5/2016 | Barrera | A01M 1/026 119/6.6 |
| 2017/0006850 | A1 * | 1/2017 | Doman | A01M 1/106 |

FOREIGN PATENT DOCUMENTS

| | | | | |
|---|---|---|---|---|
| JP | 2008161090 | A * | 7/2008 | |
| WO | WO-2009089553 | A1 * | 7/2009 | A01M 1/106 |
| WO | WO-2010113128 | A2 * | 10/2010 | A01M 1/106 |
| WO | WO-2016108088 | A1 * | 7/2016 | A01M 29/12 |

* cited by examiner

INSECT TRAP FOR A GARBAGE RECEPTACLE

FIELD OF INVENTION

The present invention relates to insect traps used in garbage receptacles. More particularly, to insect traps that attach or are incorporated into the lid of a garbage receptacle to reduce or eliminate insects, such as flies, in and around the garbage receptacle.

DESCRIPTION OF PRIOR ART

Trash is typically kept in trash cans or other receptacles of various shapes and sizes. However, garbage has a strong tendency to attract flies and other undesirable insects that not only cause a nuisance but transport harmful bacteria or viruses. Garbage is usually kept in garbage receptacles for extended periods of time waiting for later disposal. But during the time that the garbage is kept in the garbage receptacles, insects are presumably kept out by a lid or cover on the receptacle. However, the effectiveness of the garbage receptacle lid is questionable, especially when the receptacle is routinely opened to add more garbage. Thus, despite the lid, a multitude of flies and insects continue to be attracted and gain entry to the interior of the garbage receptacle.

Efforts to eliminate or reduce the number of flies and insects around garbage receptacles are numerous and include an adhesive tape that is attached around the rim of a trash can, as taught by U.S. Patent Application No. 2013/0255134. Furthermore, U.S. Patent Application No. 2006/0242891 teaches an insert that is attached to the bottom of a trash can and that contains insecticide or other chemicals to repel flies and insects. Additionally, numerous attempts have been made to modify a trash can lid so as to incorporate an insect trap mechanism or apparatus therein. Such are disclosed in U.S. Pat. No. 1,607,249 and U.S. Patent Application No. 2008/0163541.

However, none of the prior art has been able to teach an insect trap that can be attached or retrofitted into any trash receptacle lid, effectively trap flies and insects attracted by the natural odor emanating from the garbage, and dispose the trapped insects into the garbage receptacle without the need to have physical contact therewith. Unless these and other practical problems associated with insect traps are resolved, the nuisance and risks associated with flies and insects will persist and an effective trapping device will fail to be realized.

SUMMARY OF THE INVENTION

Accordingly, the present invention has been made in view of the above-mentioned disadvantages occurring in the prior art. The present invention is an insect trap that reduces the fly and insect population by entrapping them. The present invention is attached to the garbage receptacle lid or it can be molded as part of the garbage receptacle lid itself. Furthermore, the insect trap of the present invention includes a trap containment cartridge that is disposable and is removably attached to the insect trap.

It is therefore a primary object of the present invention to trap flies and other insects that are attracted by the natural odor emanating from the garbage.

An object of the present invention is to allow the odor emanating from the garbage to flow outside so as to lure flies and other insects into a trap containment cartridge.

Another object of the present invention is to easily attach the insect trap to any garbage receptacle lid or the lid of any container.

Yet another object of the present invention is to allow for the quick release of a trap containment cartridge in which flies and insects are trapped.

A final object of the present invention is to provide an insect trap that can be manufactured or incorporated into the lid of a garbage receptacle or a container.

The above objects and other features and advantages of the present invention, as well as the structure and operation of various embodiments of the present invention, are described in detail below with reference to the accompanying drawings.

DESCRIPTION OF DRAWINGS

The accompanying drawings which are incorporated by reference herein and form part of the specification, illustrate various embodiments of the present invention and, together with the description, further serve to explain the principles of the invention and to enable a person skilled in the pertinent art to make and use the invention. In the drawings, like reference numbers indicate identical or functional similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Reference will now be made to the drawings in which various elements of the present invention will be given numerical designations and in which the invention will be discussed so as to enable one skilled in the art to make and use the invention.

Figure 1:
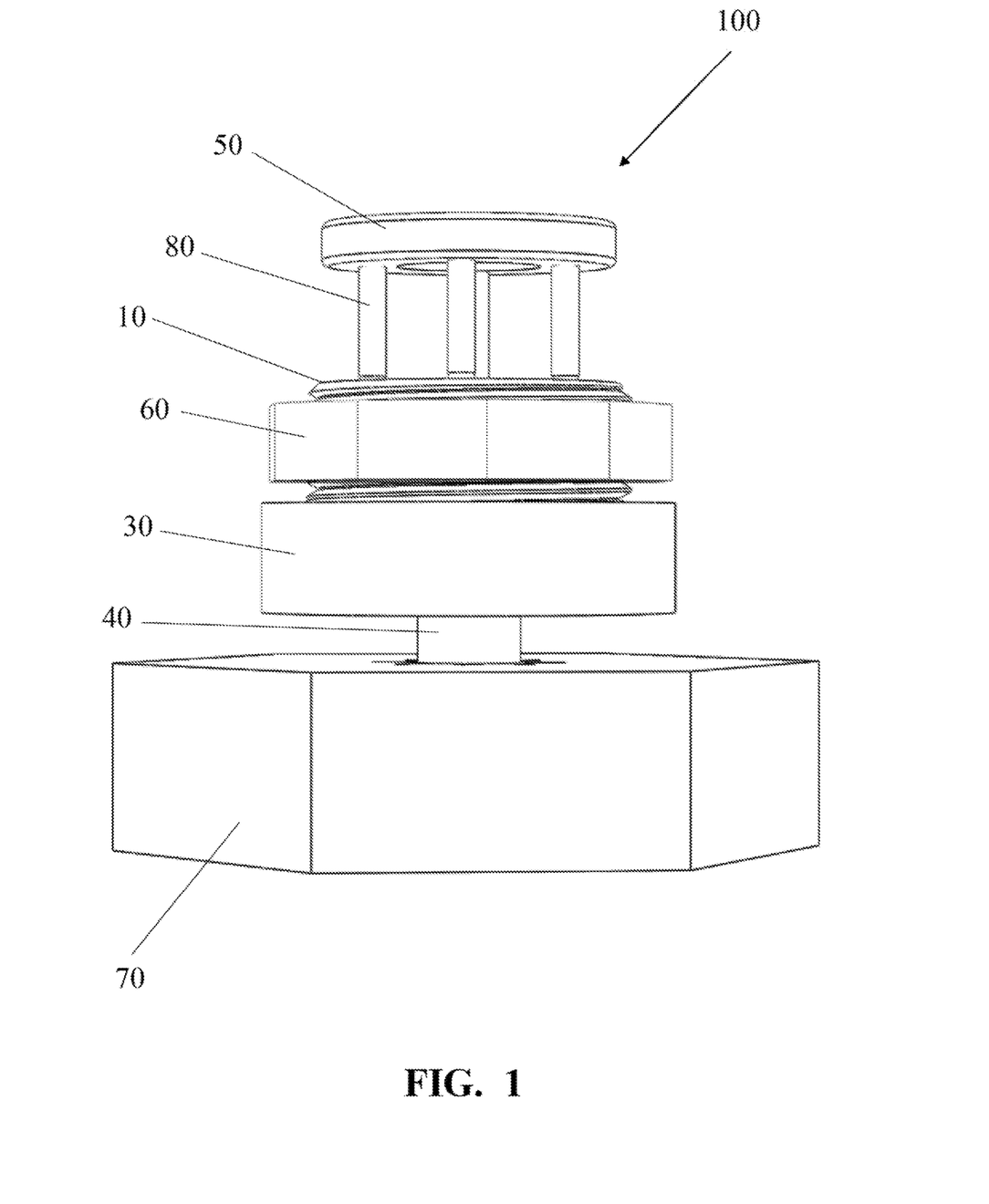
FIG. 1 is a perspective view of the insect trap of the present invention in its assembled state as it would be installed to a garbage receptacle.
Figure 2:
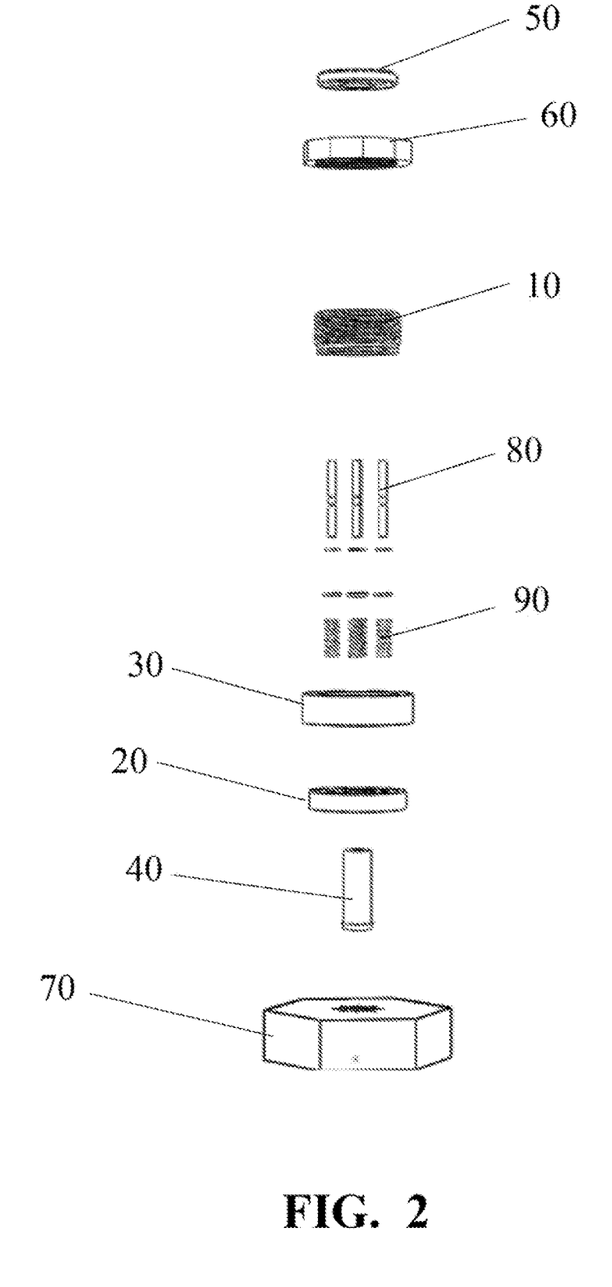
FIG. 2 is an exploded view of the insect trap of the present invention.

The insect trap 100 of the present invention comprises a housing 10, a release plate 20, a sleeve 30, a post 40, an actuator 50, a retaining nut 60, and a trap compartment 70. FIG. 1 shows a perspective view of the insect trap 100 of the present invention in its assembled state as it would be attached to a garbage receptacle 200 or a container to trap flies and other insects. FIG. 2 shows an exploded view of the insect trap 100 of the present invention to depict in greater detail the various components that comprise the insect trap 100.

Figure 3A:
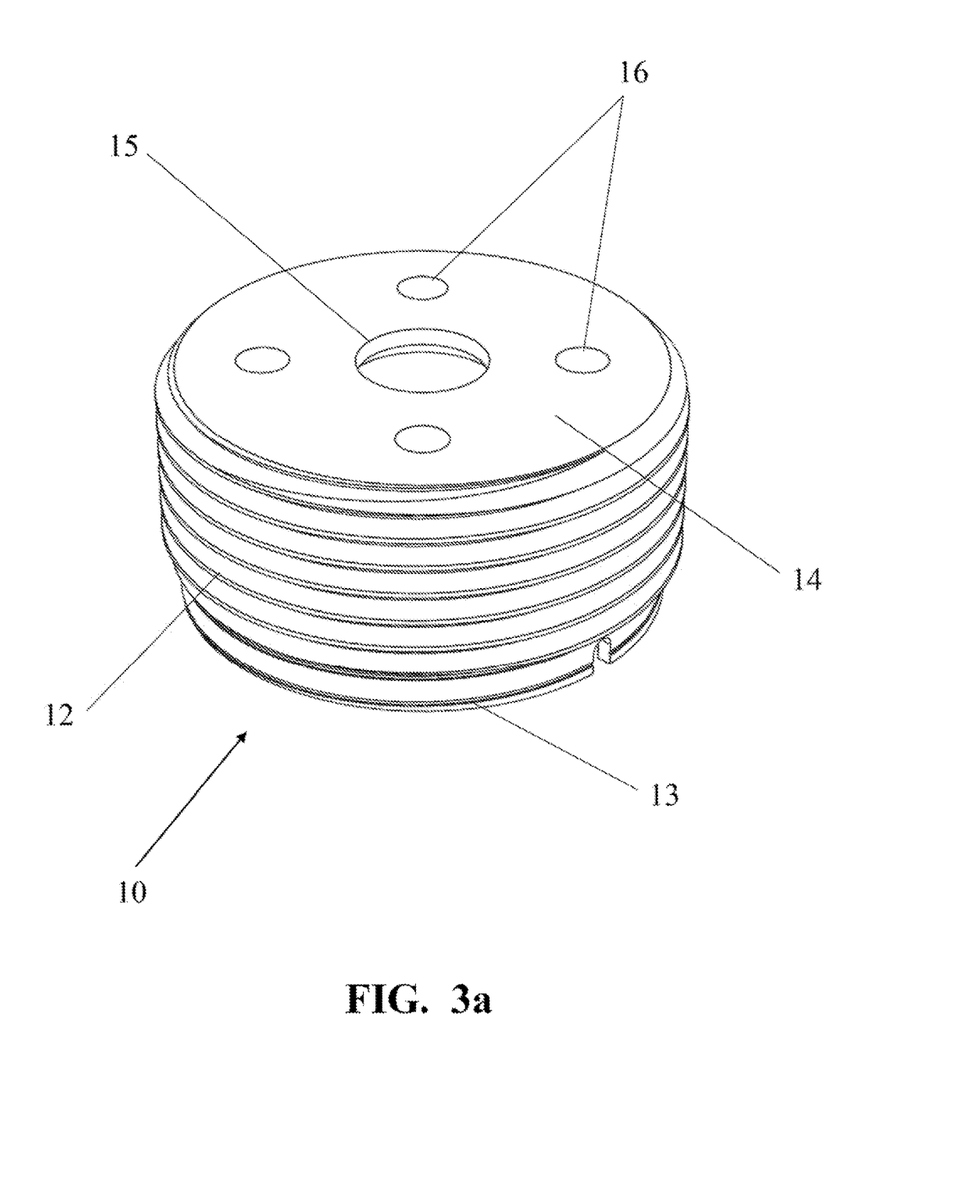
FIGS. 3a and 3b are perspective views of the housing of the present invention.
Figure 3B:
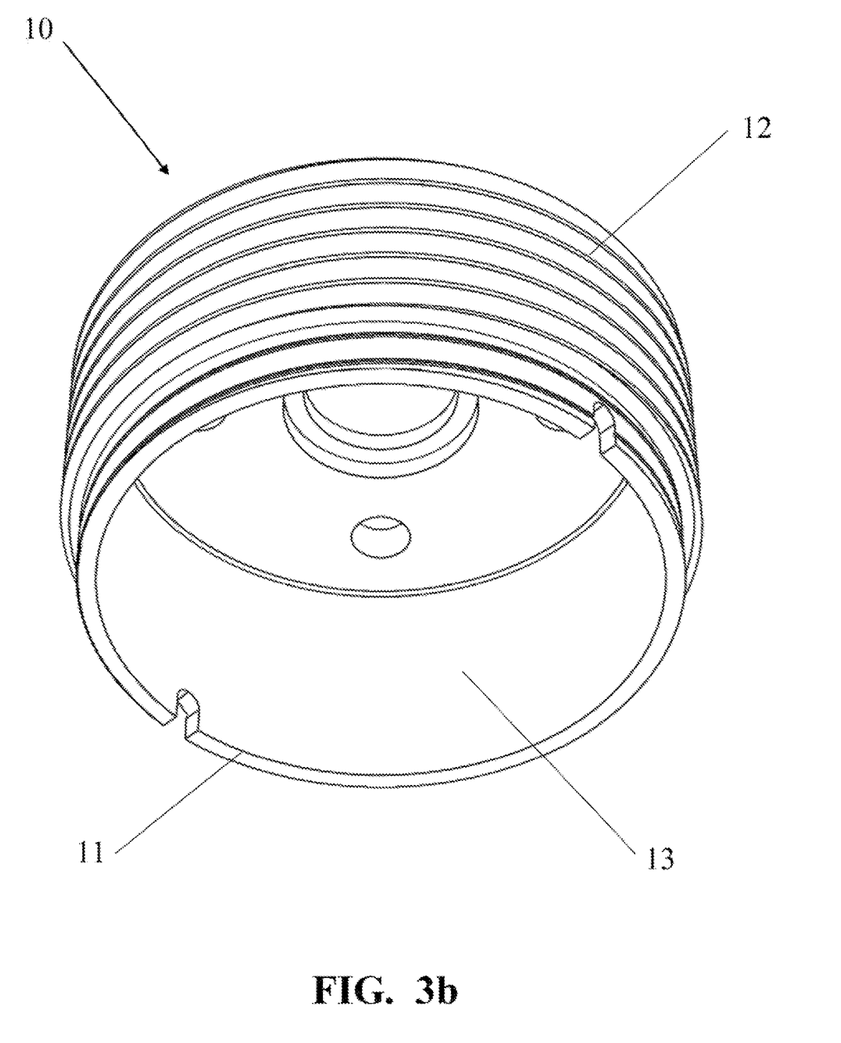

As shown in FIGS. 3a and 3b, the insect trap 100 of the present invention has a housing 10 that is cylindrical in shape and having a sidewall 11 the exterior of which has external threads 12. Said sidewall 11 extends downwardly to define a downwardly open cavity 13. Said housing 10 also has a top surface 14 that has a center hole 15 and a plurality of shaft holes 16.

Figure 4A:
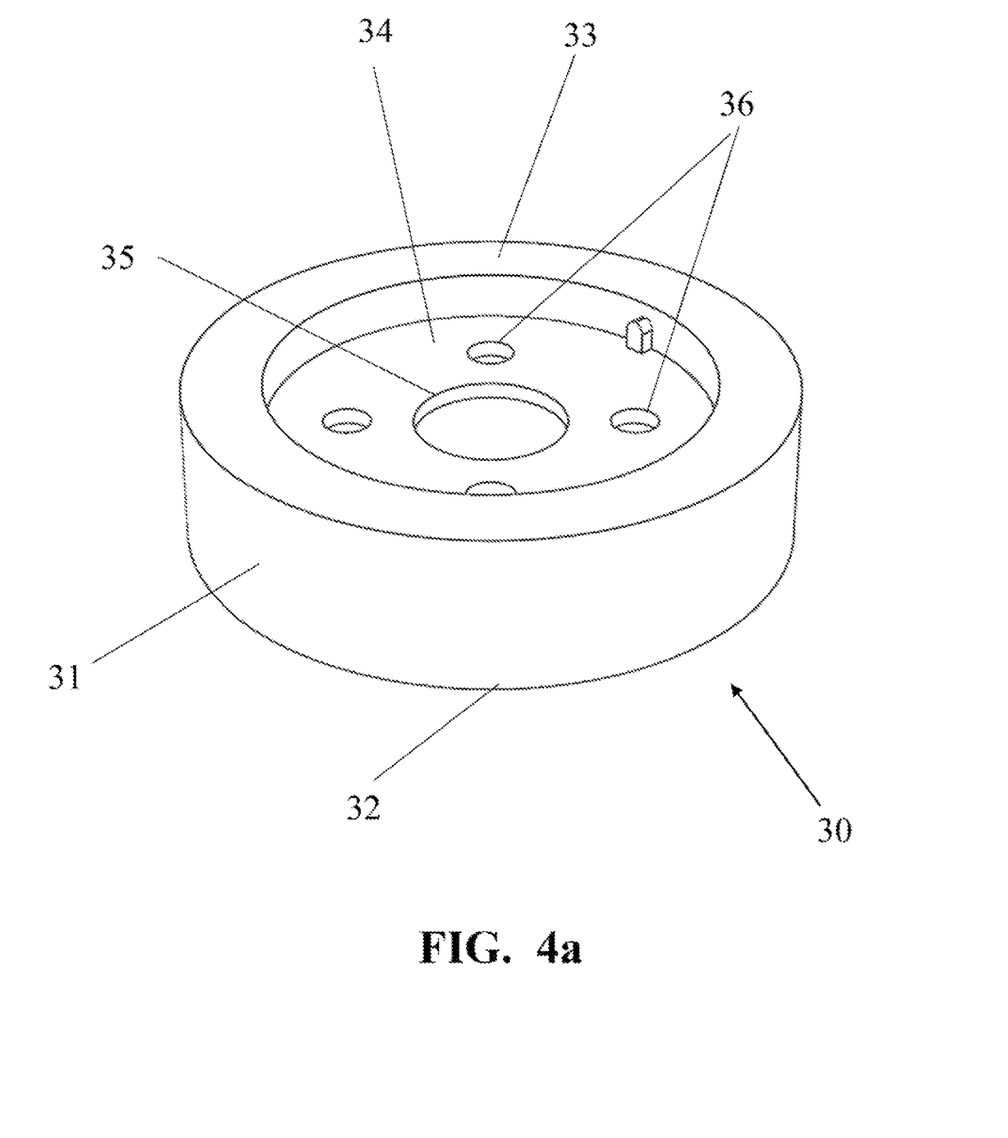
FIGS. 4a and 4b are perspective views of the sleeve of the present invention.
Figure 4B:
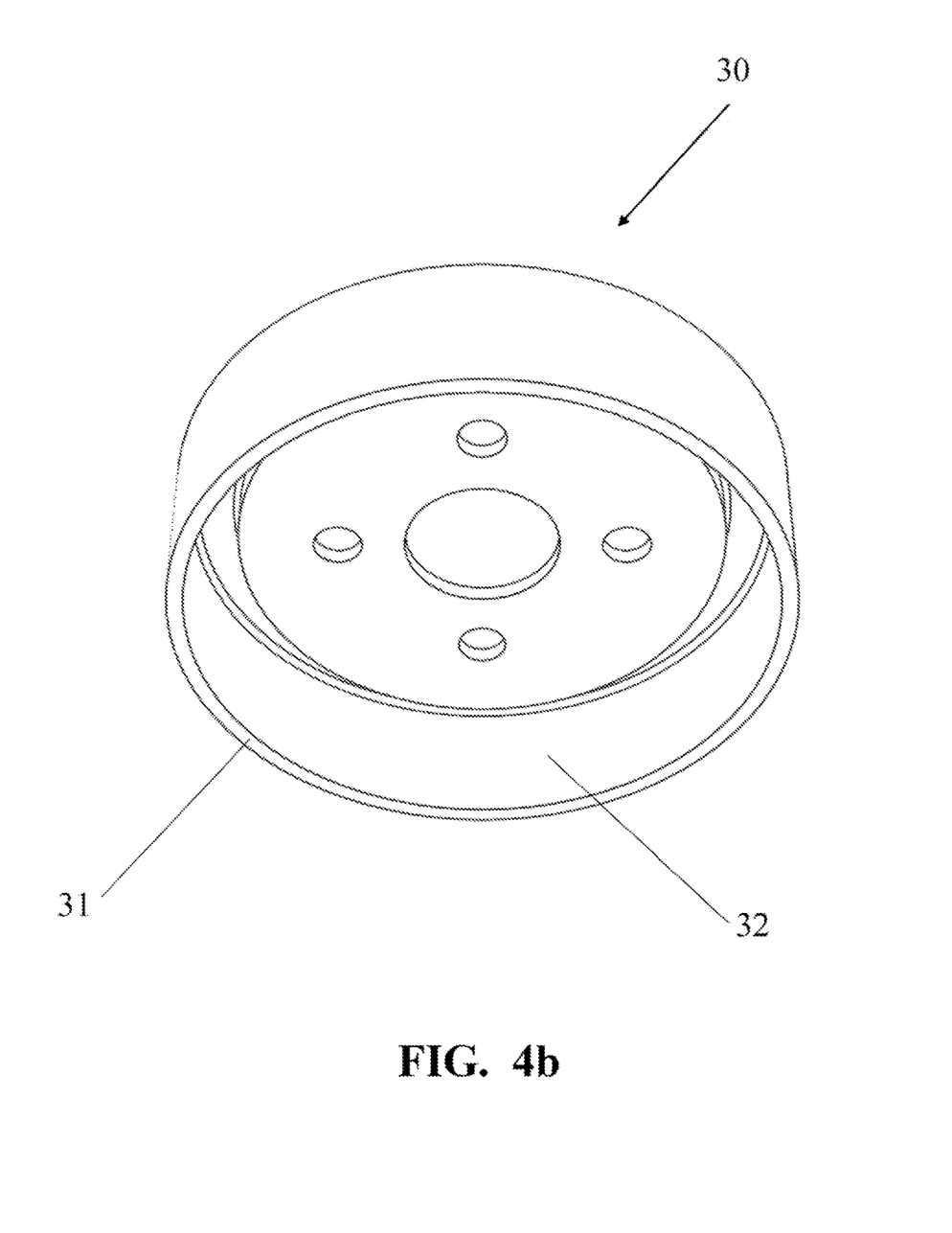

As shown in FIGS. 4a and 4b, the insect trap of the present invention has a sleeve 30 having at least one annular sidewall 31 that extends downwardly to define a downwardly open cavity 32. Furthermore, the sleeve 30 has a top surface 33 from which a recessed surface 34 is recessed downwardly. Additionally, said recessed surface 34 has a center hole 35 and a plurality of shaft holes 36.

Figure 5A:
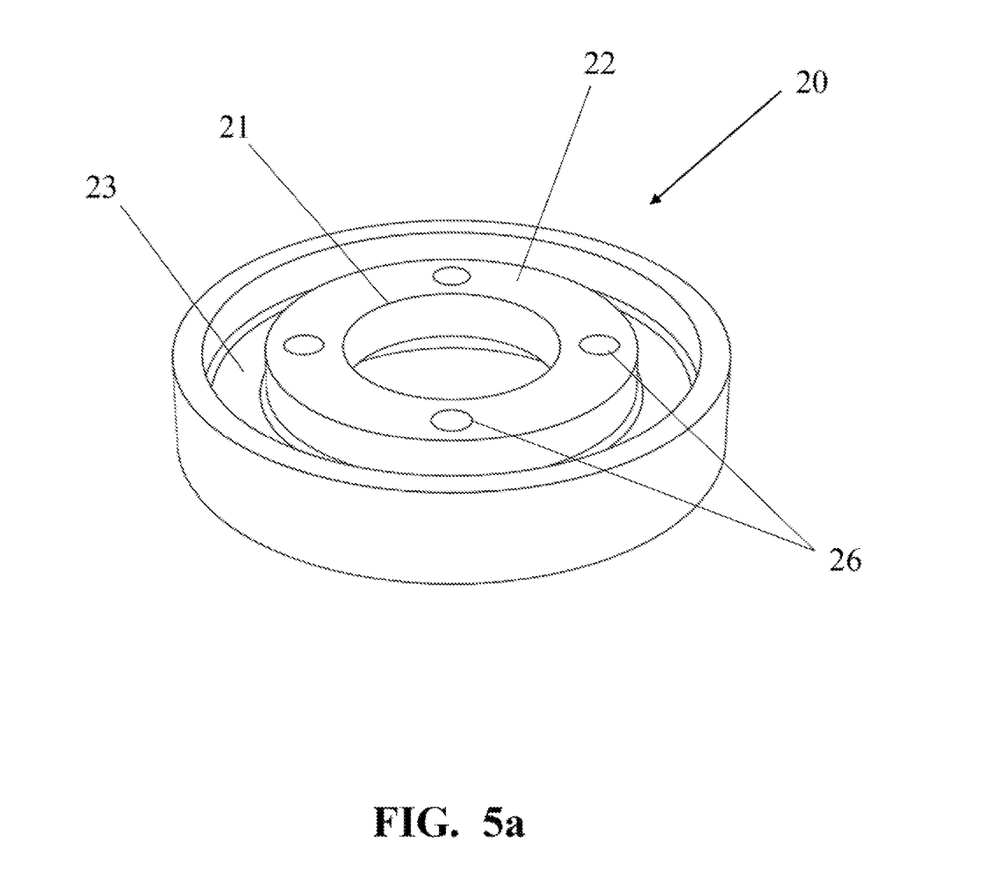
FIGS. 5a and 5b are perspective views of the release plate of the present invention.
Figure 5B:
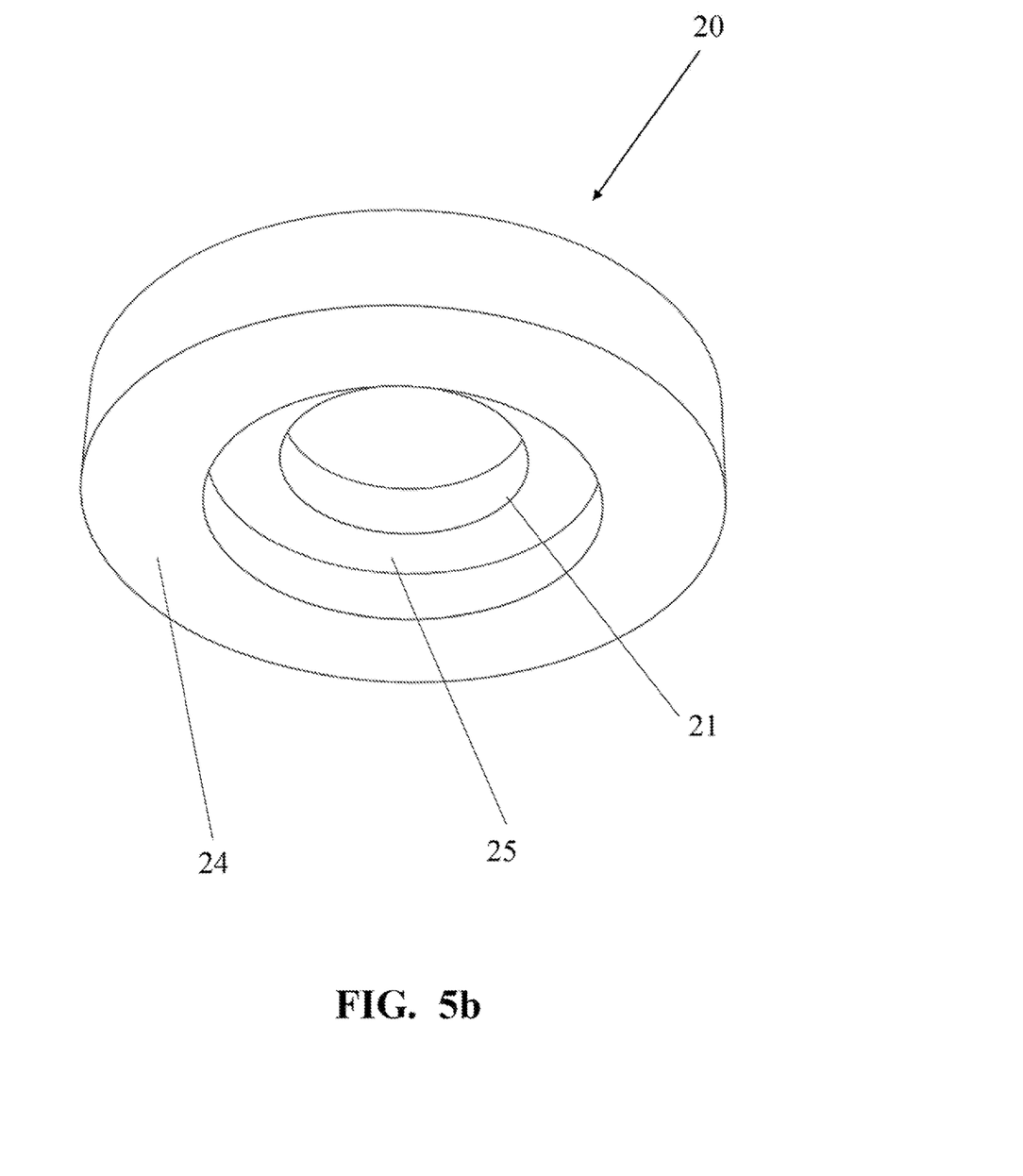

As shown in FIGS. 5a and 5b, the release plate 20 is a plate that fits within the cavity 32 of the sleeve 30 and that has a center hole 21. Furthermore, the release plate 20 has a top surface 22 from which a recessed surface 23 is recessed downwardly. Additionally, said top surface 22 has a plurality of shaft cavities 26 into which the shafts 80 are attached preferably through press fit, gluing, or vibration welding. In addition, the release plate 20 has a bottom surface 24 from which a recessed surface 25 is recessed upwardly.

Figure 6A:
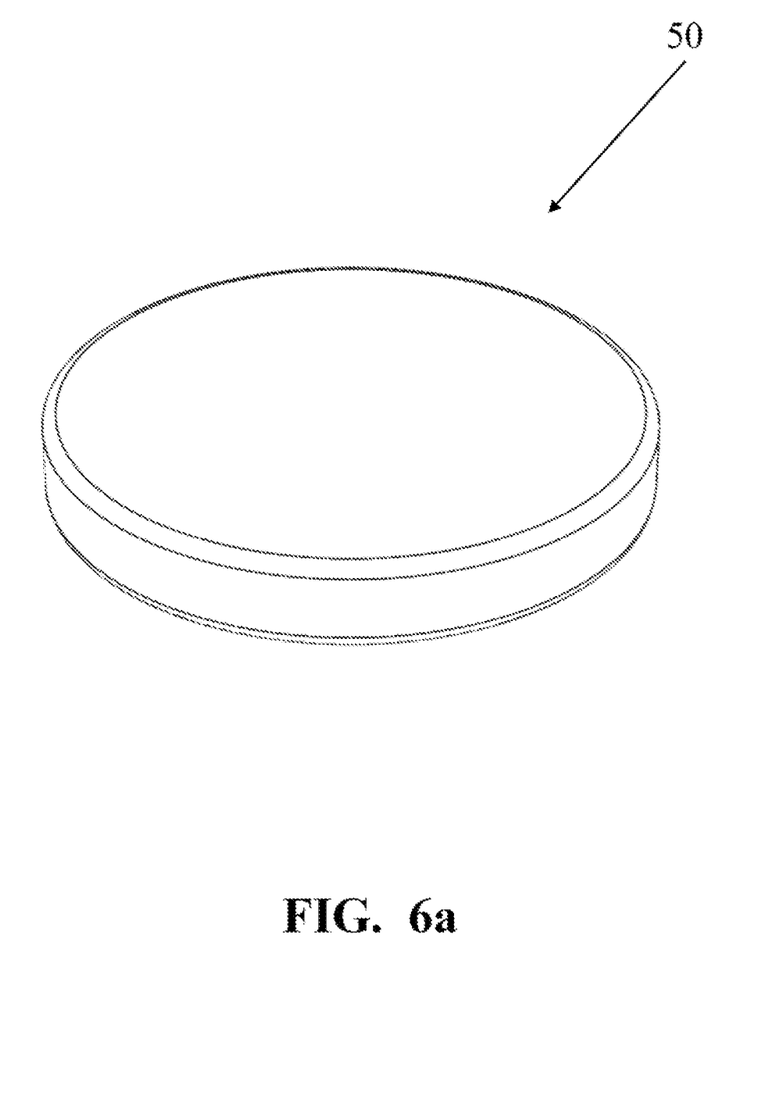
FIGS. 6a and 6b are perspective views of the actuator of the present invention.
Figure 6B:
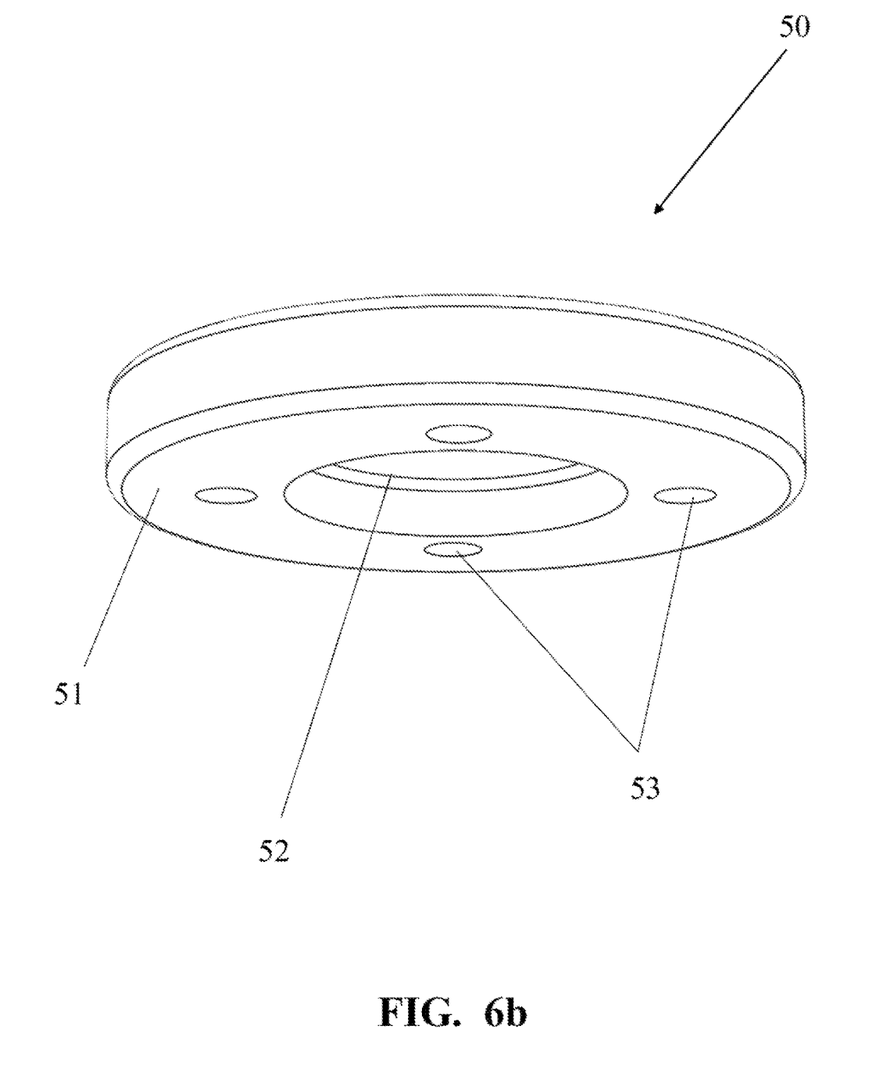

As shown in FIGS. 6a and 6b, the actuator 50 is a plate smaller in size than the release plate 20 and without any holes. Furthermore, the actuator 50 has a bottom surface 51 from which a recessed surface 52 is recessed upwardly. In addition, the bottom surface 51 has a plurality of shaft cavities 53 into which the shafts 80 are attached preferably through press fit, gluing, or vibration welding.

Figure 7:
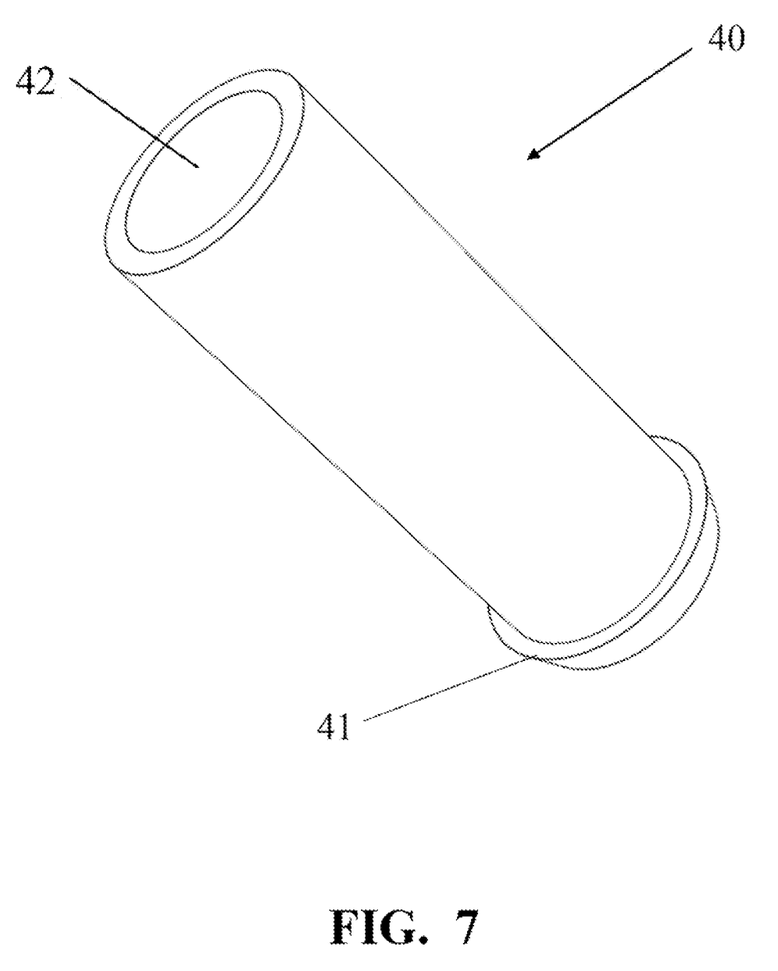
FIG. 7 is a perspective view of the post of the present invention.

As shown in FIG. 7, the post 40 is an annular tube with a hole 42 that extends longitudinally. The post 40 is sized to be press fit or glued into the center hole 15 of the housing 10. Additionally, the lowermost end of the post 40 has a ring 41 that protrudes radially outward.

Hereinafter, an explanation on the methods of assembling the insect trap 100 of the present invention, the installation thereof to a garbage receptacle 200 or a container, and the operating states thereof will be given.

Figure 8:
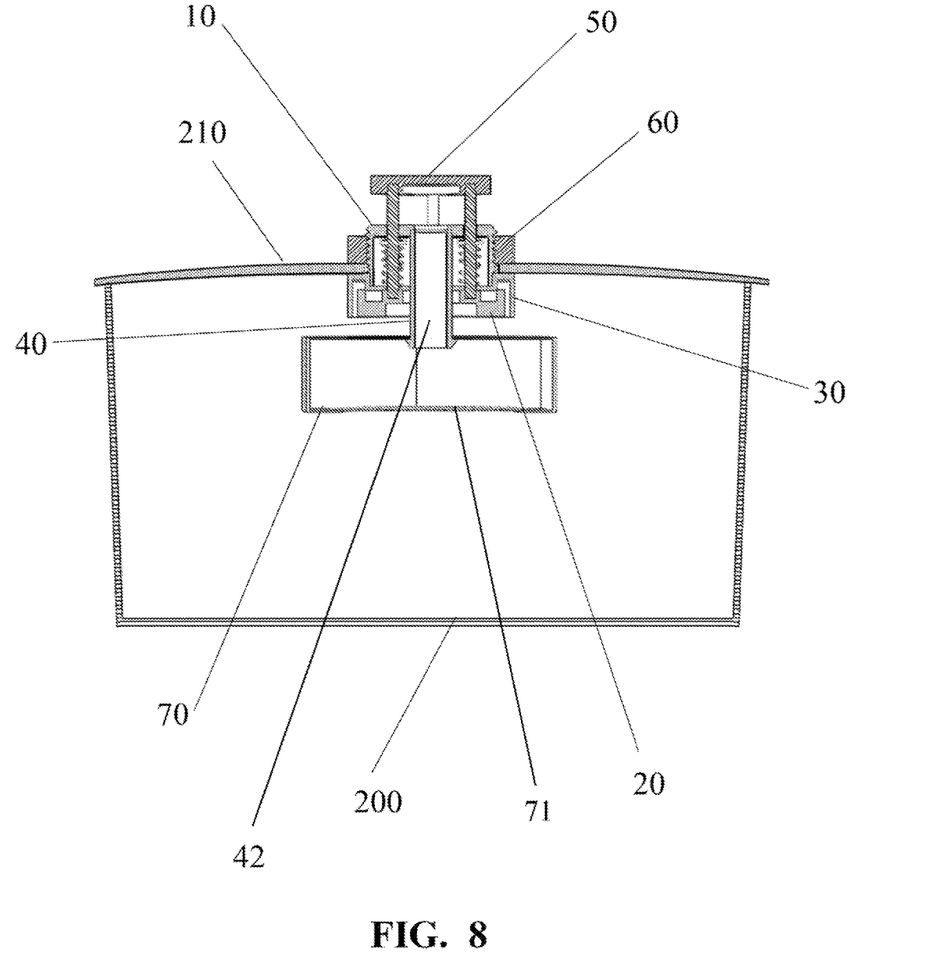
FIG. 8 is a cross sectional view of the insect trap of the present invention installed to a garbage receptacle lid and in its normal position with the trap compartment attached to the post.

For the assembly of the insect trap 100 of the present invention, a plurality of shafts 80 are attached to the bottom side 51 of the actuator 50. The shafts 80 are then inserted through the shaft holes 16 in the housing 10. A spring 90 is then slipped around each shaft 80 within the cavity 13 of said housing 10. The sleeve 30 is then attached underneath the housing 10 such that the lowermost end of the housing 10 is pressed fit or glued into the recess of the sleeve 30 and the shafts 80 are passed through the shaft holes 36 of the sleeve 30, as shown in FIG. 8. With the lowermost ends of the shafts 80 extending into the cavity 32 of the sleeve 30, the release plate 20 is attached thereto.

Thus, the release plate 20 is attached to the shafts 80 and normally sits within the cavity 32 of the sleeve 30. The actuator 50 can then be displaced downward toward the housing 10 such that the release plate 20 is displaced by the shafts 80 downward to extend out of the cavity 32. However, displacement of the actuator 50 can only occur with sufficient force that overcomes the compressive force of the springs 90. As the actuator 50 is displaced downward, the springs 90 are compressed within the cavity 13 of the housing 10. When the actuator 50 is released, the compressive force of the springs 90 push the actuator 50 back upward so as to retract the release plate 20 back into the cavity 32 of the sleeve 30.

Figure 9:
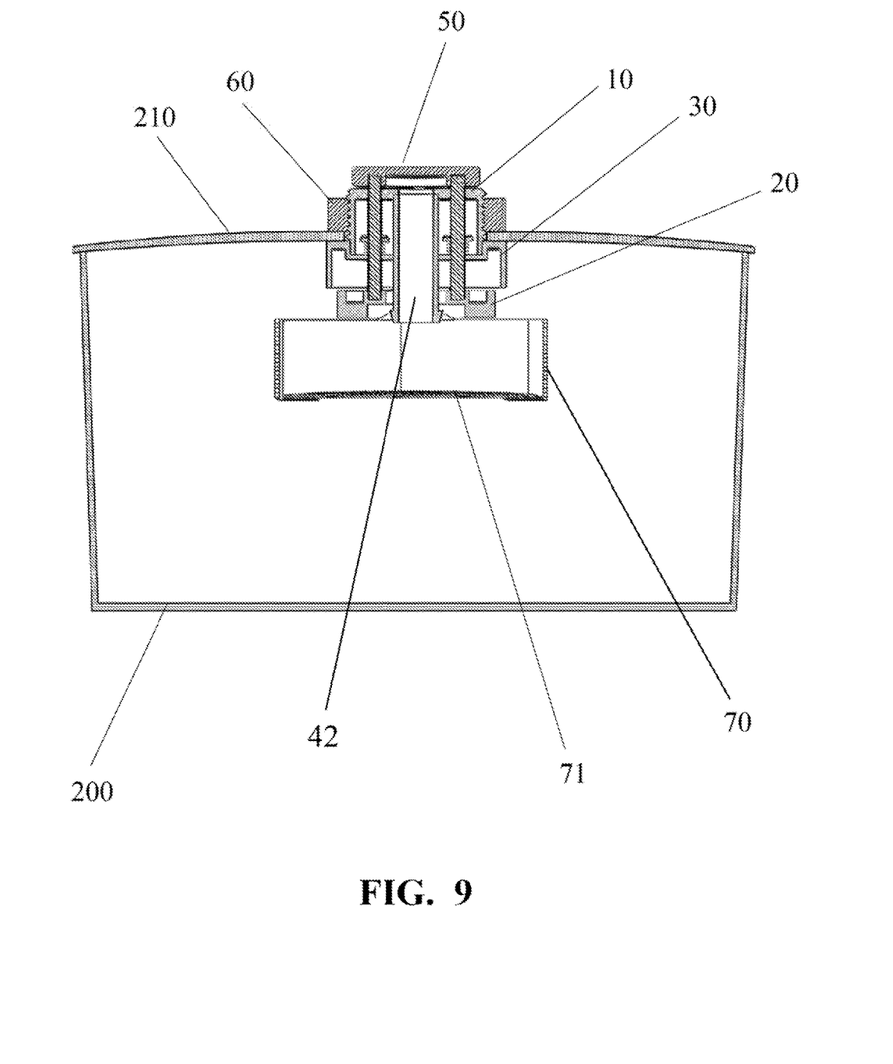
FIG. 9 is a cross sectional view of the insect trap of the present invention installed to a garbage receptacle lid and with the actuator displaced down and the trap compartment released or dislodged from the post.

Then the post 40 is inserted through the center hole 21 of the release plate 20, then through the center hole 35 of the sleeve 30, and pressed fit or glued into the center hole 15 of the housing 10. Thus, the lowermost end of the post 40 extends downward past the cavity 32 of the sleeve 30 and past the release plate 20, as shown in FIG. 8. When the actuator 50 is displaced downward, as discussed above, the release plate 20 is displaced downward to the lowermost end of the post 40, as shown in FIG. 9.

The assembly of the insect trap 100 of the present invention as discussed above is expected to be completed by the manufacturer prior to the distribution or sale of the insect trap 100 to a consumer. Installation of the insect trap 100 of the present invention requires attachment of the trap compartment 70 to the lowermost end of the post 40 such that it is held in place by the ring 41, as shown in FIG. 8. The insect trap 100 is then installed to a garbage receptacle 200 by inserting the housing 10 through a hole in the garbage receptacle lid 210. The retaining nut 60 is then used to secure the insect trap 100 to the garbage receptacle lid 210 by attaching it to the external threads 12 in the housing 10 such that the garbage receptacle lid 210 is pressed in between the retaining nut 60 and the sleeve, as shown in FIG. 8.

Figure 10:
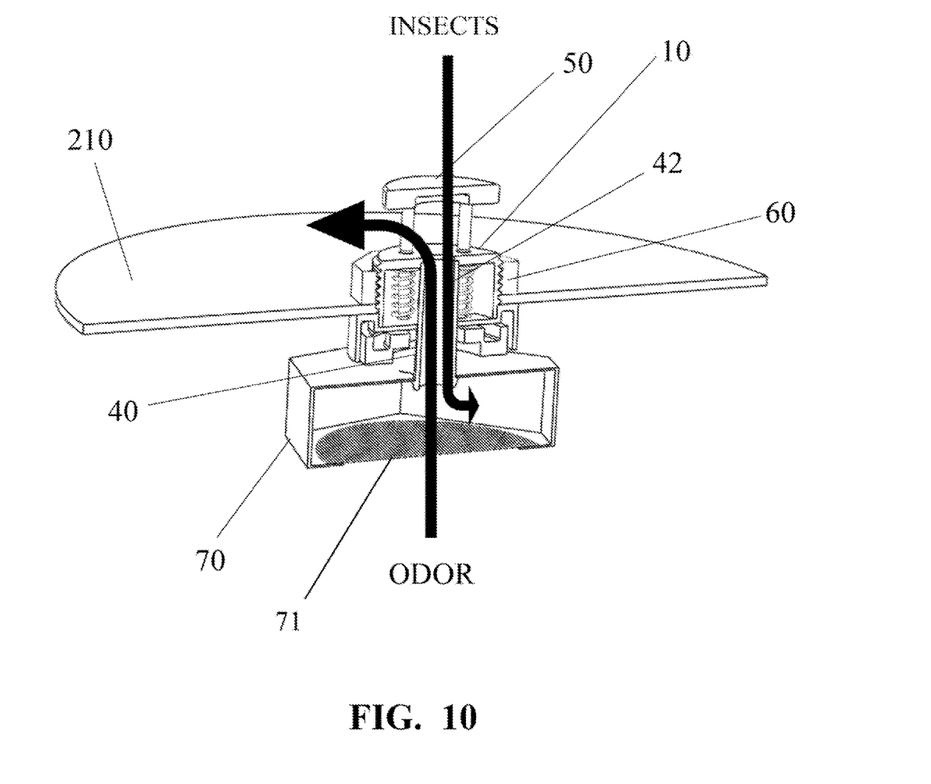
FIG. 10 is a cross sectional view of the insect trap of the present invention installed to a garbage receptacle lid. Arrows show the flow of the odor from the garbage flowing out through the hole in the post and the path of flies or other insects lured into the hole in the post and into the trap compartment.

Once installed, flies and insects in the vicinity of the garbage receptacle 200 are lured into the trap compartment 70 by the natural odor emanating from the garbage. The hole 41 in the post 40 allows the odor emanating from the garbage to flow out of the garbage receptacle 200. The trap compartment 70 that is attached to the lowermost end of the post 40 has a screen 71 attached to the bottom surface 72. Said screen 71 allows the odor from the garbage to flow through and out the hole 41 in the post 40, as shown by FIG. 10. The flies and other insects are lured by the odor into the hole 41 in the post 40. Once inside, flies and other insects proceed following the odor down through the hole 41 until they enter the trap compartment 70 in which they are trapped.

When desired or when the trap compartment 70 is full of trapped flies or insects, the actuator 50 is displaced downward to induce the downward displacement of the release plate 20 that pushes and dislodges the trap compartment 70 from the post 40. The compressive force of the springs 90 then allow the actuator 50 and release plate 20 to retract to their original positions. In essence, pushing the actuator 50 results in the release or dislodgment of the trap compartment 70 from the insect trap 100 of the present invention without having to physically touch or be in contact with the trap compartment 70. Since the insect trap 100 is attached to a garbage receptacle lid 210, pushing the actuator 50 results in releasing the trap compartment 70 into the garbage receptacle 200. Thereafter, a fresh new trap compartment 70 can be reattached to the post 40 for further entrapment of flies and insects without having to remove or disassemble the insect trap 100 from the garbage receptacle 200.

An alternative embodiment of the present invention comprises the insect trap 100 being incorporated or molded directly onto the garbage receptacle lid 210. In essence, the housing 10 is molded or incorporated as part of the garbage receptacle lid 210 and the other components are assembled to the housing 10 in a similar fashion as described above.

Similarly, another alternative embodiment of the present invention comprises the insect trap 100 being incorporated or molded directly to the sidewall of the garbage receptacle rather than the lid 210. In this embodiment, the post 40 would be placed in a horizontal position.

In addition, other alternative embodiments of the present invention allow for different types of release mechanisms to release the trap compartment 70. Although the preferred embodiment discloses an actuator 50 that is pushed in against the resistive force of the springs 90, an alternative embodiment utilizes a actuator 50 that is pulled out rather than pushed in. In this embodiment, the actuator 50 is pulled out to release the trap compartment 70 from the insect trap 100 of the present invention. Thus, when the actuator 50 is pulled up, the trap compartment 70 is raised up such that it is pressed against the release plate 20 until the trap compartment 70 is released.

Yet another alternative embodiment comprises the insect trap 100 of the present invention with an actuator 50 that rotates. Said actuator 50 is rotatably attached to the housing 10 and can be rotated so as to displace the post 40 sufficient distance to release the trap compartment 70. In this embodiment, the post 40 has external threads that mate or interact with some internal threads at the center hole 15 of the housing 10. When the post 40 is rotated in one direction, the post 40 is displaced upward to push the trap compartment 70 against the release plate 20 until it is released. Then the post 40 can be rotated in the opposite direction to displace the post 40 downward so that a new trap compartment can be attached for more insect trapping.

A final embodiment of the present invention comprises the insect trap 100 with a release mechanism that can be controlled remotely by a remote control unit so that the trap compartment 70 can be released without ever having to touch or be near the garbage receptacle 200.

It is understood that the described embodiments of the present invention are illustrative only, and that modifications thereof may occur to those skilled in the art. Accordingly, this invention is not to be regarded as limited to the embodiments disclosed, but to be limited only as defined by the appended claims herein.

What is claimed is:

1. An insect trap for a garbage receptacle comprising:
   a housing having a top plate with a plurality of shaft holes;
   an actuator to which a plurality of shafts are attached and wherein said shafts have bottom ends that are passed downwardly through said shaft holes;
   a release plate attached to said bottom ends of said shafts;
   a post having a bottom end that extends downwardly through said release plate, a top end that is attached to said top plate of said housing, and a hole that extends longitudinally;
   a trap compartment that is releasably attached to said bottom end of said post; and
   wherein said actuator can be displaced downward to allow said release plate to push against said trap compartment such that said trap compartment is released.

2. The insect trap of claim 1 further comprising a plurality of springs within said housing that displace said release plate upward after said trap compartment is released.

3. The insect trap of claim 1 further comprising a sleeve that encloses said release plate and that promotes an attachment of said housing to a garbage receptacle.

4. The insect trap of claim 1 wherein said housing has external threads and further comprising a nut with internal threads that interact with said external threads of said housing to promote an attachment of said housing to a garbage receptacle.

5. The insect trap of claim 1 wherein said post further comprises a ring that radially protrudes outward and that promotes an attachment of said trap compartment to said post.

6. The insect trap of claim 1 wherein the insect trap is in combination with the garbage receptacle, wherein said housing is attached to a lid of said garbage receptacle.

7. The insect trap of claim 6 wherein garbage within said garbage receptacle attracts insects into said trap compartment for entrapment.

8. The insect trap of claim 1 wherein said housing, release plate, and actuator are manufactured out of a thermoplastic material.

9. The insect trap of claim 1 wherein insects are lured into said hole of said post and into said trap compartment.

10. An insect trap in combination with a garbage receptacle comprising:
    a housing;
    a post having a bottom end and a hole that extends longitudinally;
    a trap compartment that is releasably attached to said bottom end of said post;
    a release plate attached to an actuator by a plurality of shafts extending through openings in the housing;
    wherein said housing is attached to said garbage receptacle such that said trap compartment is inside said garbage receptacle; and
    wherein said release plate can be displaced to push against said trap compartment such that said trap compartment is released.

11. The insect trap of claim 10 further comprising a plurality of springs within said housing that displace said release plate upward after said trap compartment is released.

12. The insect trap of claim 10 further comprising a sleeve that encloses said release plate and that promotes an attachment of said housing to said garbage receptacle.

13. The insect trap of claim 10 wherein said housing has external threads and further comprising a nut with internal threads that interact with said external threads of said housing to promote an attachment of said housing to said garbage receptacle.

14. The insect trap of claim 10 wherein said post further comprises a ring that radially protrudes outward and that promotes an attachment of said trap compartment to said post.

15. The insect trap of claim 10 wherein said housing is attached to a lid of said garbage receptacle.

16. The insect trap of claim 10 wherein said housing, release plate, and actuator are manufactured out of a thermoplastic material.

17. The insect trap of claim 10 wherein garbage within said garbage receptacle attracts insects into said trap compartment for entrapment.

18. The insect trap of claim 10 wherein insects are lured into said hole of said post and into said trap compartment.

* * * * *